(12) United States Patent
Saito et al.

(10) Patent No.: US 11,629,260 B2
(45) Date of Patent: Apr. 18, 2023

(54) RADIATION-CURABLE INK JET COMPOSITION AND INK JET METHOD

(71) Applicant: SEIKO EPSON CORPORATION, Tokyo (JP)

(72) Inventors: Toru Saito, Yamagata (JP); Naoki Koike, Matsumoto (JP); Toshiyuki Yoda, Matsumoto (JP); Kyohei Tanaka, Sagamihara (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/851,353

(22) Filed: Jun. 28, 2022

(65) Prior Publication Data

US 2022/0332961 A1 Oct. 20, 2022

Related U.S. Application Data

(63) Continuation of application No. 17/017,865, filed on Sep. 11, 2020, now Pat. No. 11,407,908.

(30) Foreign Application Priority Data

Sep. 12, 2019 (JP) .............................. JP2019-166070

(51) Int. Cl.
*C09D 11/101* (2014.01)
*C09D 11/30* (2014.01)
*B41J 11/00* (2006.01)
*B41M 5/00* (2006.01)
*C09D 11/38* (2014.01)

(52) U.S. Cl.
CPC .......... *C09D 11/101* (2013.01); *B41J 11/002* (2013.01); *B41M 5/0023* (2013.01); *C09D 11/30* (2013.01); *C09D 11/38* (2013.01)

(58) Field of Classification Search
CPC ....... C09D 11/101; C09D 11/38; C09D 11/30; B41J 11/002; B41J 2/2107
See application file for complete search history.

(56) References Cited

U.S. PATENT DOCUMENTS

| | | |
|---|---|---|
| 2006/0289826 A1 | 12/2006 | Koyama et al. |
| 2009/0088491 A1 | 4/2009 | Hanawa et al. |
| 2012/0133059 A1 | 5/2012 | Ito et al. |
| 2012/0200653 A1 | 8/2012 | Shimohara et al. |
| 2013/0260092 A1 | 10/2013 | Araki et al. |
| 2017/0107386 A1 | 4/2017 | Herlihy et al. |
| 2018/0079921 A1 | 3/2018 | Okamoto et al. |
| 2019/0375954 A1 | 12/2019 | Fleckenstein et al. |
| 2021/0079242 A1 | 3/2021 | Yoda et al. |
| 2021/0102079 A1 | 4/2021 | Bohringer et al. |
| 2021/0403732 A1* | 12/2021 | Koike .................. B41J 11/0021 |
| 2022/0380611 A1* | 12/2022 | Volkmann ............ C08F 220/301 |

FOREIGN PATENT DOCUMENTS

| | | |
|---|---|---|
| JP | 2012-116934 A | 6/2012 |
| JP | 2012-162688 A | 8/2012 |

* cited by examiner

*Primary Examiner* — John Zimmermann
(74) *Attorney, Agent, or Firm* — Harness, Dickey & Pierce, P.L.C.

(57) ABSTRACT

A radiation-curable ink jet composition includes a multifunctional monomer and a vinyl methyl oxazolidinone. The content of the multifunctional monomer is 5 to 50 mass % based on the total amount of the radiation-curable ink jet composition.

11 Claims, 1 Drawing Sheet

RADIATION-CURABLE INK JET COMPOSITION AND INK JET METHOD

This application is a continuation of U.S. application Ser. No. 17/017,865 filed Sep. 11, 2020 which is based on, and claims priority from JP Application Serial Number 2019-166070, filed Sep. 12, 2019, the disclosures of which are hereby incorporated by reference herein in their entireties.

BACKGROUND

1. Technical Field

The present disclosure relates to a radiation-curable ink jet composition and an ink jet method.

2. Related Art

An ink jet recording method can record high definition images with a relatively simple apparatus and has been rapidly developed in various fields. In such circumstances, improvement in various characteristics has been variously investigated. For example, JP-A-2012-116934 discloses a radiation-curable ink jet ink composition containing 20 mass % or more and 50 mass % or less of a vinyl ether group-containing (meth)acrylate and 5 mass % or more and 15 mass % or less of N-vinylcaprolactam for the purpose of providing a radiation-curable ink jet ink composition showing excellent scratch resistance, adhesion, and alcohol resistance and a recorded matter and an ink jet recording method using the ink composition.

In addition, JP-A-2012-162688 discloses a photocurable ink jet ink composition containing 40 mass % or more and 75 mass % or less of a vinyl ether group-containing (meth)acrylate, 1 mass % or more and 20 mass % or less of a urethane (meth)acrylate oligomer, and a photopolymerization initiator for the purpose of providing a photocurable ink jet ink that can provide printed matter having excellent film characteristics, in particular, stretchability, while having low viscosity and high reactivity.

However, although N-vinylcaprolactam that is used in JP-A-2012-116934 shows excellent adhesion and scratch resistance of a coating film, since the boiling point is low, handling at ordinary temperature is difficult. In addition, since it tends to increase the viscosity of ink, there is a problem that a lot of use for ink jet ink is difficult. In addition, since the urethane acrylate oligomers that are used in JP-A-2012-162688 tend to increase the viscosity of ink, a lot of use for ink jet ink is difficult. In addition, since they are multifunctional, there is a problem that they are inferior in stretchability of a coating film. Inks having these problems tend to be unsuitable for, in particular, sign application.

Accordingly, there is a demand for a radiation-curable ink jet composition hardly increasing the viscosity of ink and having excellent stretchability.

SUMMARY

The present disclosure is a radiation-curable ink jet composition including a monofunctional (meth)acrylate monomer and vinyl methyl oxazolidinone.

In the radiation-curable ink jet composition, the content of the vinyl methyl oxazolidinone may be 5 to 40 mass % based on the total amount of the radiation-curable ink jet composition.

In the radiation-curable ink jet composition, the content of the monofunctional (meth)acrylate monomer may be 10 to 50 mass % based on the total amount of the radiation-curable ink jet composition.

The radiation-curable ink jet composition may include a vinyl ether group-containing (meth)acrylate represented by the following formula (1):

(where, $R^1$ is a hydrogen atom or a methyl group, $R^2$ is a divalent C2-C20 organic residue, and $R^3$ is a hydrogen atom or a monovalent C1-C11 organic residue).

In the radiation-curable ink jet composition, the content of the vinyl ether group-containing (meth)acrylate may be 10 to 50 mass % based on the total amount of the radiation-curable ink jet composition.

The radiation-curable ink jet composition may include, as the monofunctional (meth)acrylate monomer, at least any of a monofunctional alicyclic (meth)acrylate, a monofunctional (meth)acrylate having a cyclic ether structure, or a monofunctional (meth)acrylate having a crosslinked condensed ring structure.

The radiation-curable ink jet composition may include a multifunctional (meth)acrylate, and the content of the multifunctional (meth)acrylate may be 2 to 20 mass % based on the total amount of the radiation-curable ink jet composition.

The radiation-curable ink jet composition may include a urethane acrylate oligomer, and the content of the urethane acrylate oligomer may be 1 to 10 mass % based on the total amount of the radiation-curable ink jet composition.

The radiation-curable ink jet composition may include a 2,2,6,6-tetramethylpiperidinyl-1-oxyl derivative as a polymerization inhibitor.

The radiation-curable ink jet composition may include an acylphosphine oxide-based polymerization initiator as a photopolymerization initiator.

The radiation-curable ink jet composition may include a fluorescent whitener.

In addition, the ink jet method of the present disclosure includes a discharging step of discharging the radiation-curable ink jet composition by a liquid jet head to adhere the composition to a recording medium and an irradiation step of irradiating the radiation-curable ink jet composition adhered to the recording medium with radioactive rays.

DESCRIPTION OF EXEMPLARY EMBODIMENTS

Embodiments of the present disclosure (hereinafter, referred to as "the present embodiment") will now be described in detail with reference to the drawing as necessary, but the present disclosure is not limited thereto and can be variously modified within a range not changing the gist of the present disclosure. Incidentally, in the drawing, the same elements are denoted by the same reference numerals, and redundant description is omitted. Furthermore, the positional relationship, such as up and down or right and left, is based on the positional relationship shown in the drawing unless otherwise specified. Furthermore, the dimensional ratios in the drawing are not limited to the illustrated ratios.

In the present specification, the term "(meth)acryloyl" means acryloyl and/or methacryloyl corresponding to the acryloyl. The term "(meth)acrylate" means acrylate and/or methacrylate corresponding to the acrylate. The term "(meth)acryl" means acryl and/or methacryl corresponding to the acryl.

1. Radiation-Curable Ink Jet Composition

The radiation-curable ink jet composition (hereinafter, also simply referred to as "composition") according to the present embodiment includes a monofunctional (meth)acrylate monomer and vinyl methyl oxazolidinone and may include, for example, a photopolymerization initiator, a fluorescent whitener, a surfactant, and a polymerization inhibitor as necessary. Here, the vinyl methyl oxazolidinone refers to a compound represented by the following chemical formula:

Vinyl methyl oxazolidinone has a low viscosity compared to other N-vinyl compounds and, when used as a component of a radiation-curable ink jet composition, hardly increases the viscosity of the composition and is suitable for ink jetting. In addition, the vinyl methyl oxazolidinone can improve the adhesion and the scratch resistance of a coating film. Furthermore, it has been found that stretchability is also further improved by using the vinyl methyl oxazolidinone in combination with a monofunctional (meth)acrylate monomer.

The radiation-curable ink jet composition according to the present embodiment is a composition to be used by being discharged from an ink jet head in an ink jet method. Although a radiation-curable ink composition will now be described as an embodiment of the radiation-curable ink jet composition, the composition according to the present embodiment may be a composition other than ink compositions, for example, may be a composition to be used for 3D molding.

The radiation-curable ink jet composition of the present embodiment is cured by irradiation with radioactive rays. Examples of the radioactive rays include ultraviolet rays, electron rays, infrared rays, visible rays, and X-rays. The radioactive rays may be ultraviolet rays because its radiation source is easily available and is widely used and because a material suitable for curing by irradiation with ultraviolet rays is easily available and is widely used.

Regarding the radiation-curable ink jet composition according to the present embodiment, components that can be included therein, physical properties thereof, and a manufacturing method therefor will now be described.

1.1. Polymerizable Compound

In the present embodiment, a compound that is cured by irradiation with radioactive rays is generally called a polymerizable compound. The term "polymerizable compound" includes a monofunctional monomer having one polymerizable functional group and a multiple functional monomer having multiple polymerizable functional groups and may include an oligomer having one or more polymerizable functional groups, as necessary. A single polymerizable compound may be used, or a combination of two or more polymerizable compounds may be used.

The polymerizable compound of the present embodiment includes a monofunctional (meth)acrylate monomer and vinyl methyl oxazolidinone and may include another polymerizable compound, as necessary. The other polymerizable compound is not particularly limited, and examples thereof include monofunctional monomers other than the monofunctional (meth)acrylate monomer and vinyl methyl oxazolidinone, multifunctional monomers, and oligomers such as a urethane oligomer.

1.1.1. Monofunctional (Meth)Acrylate Monomer

The monofunctional (meth)acrylate monomer is not particularly limited, and examples thereof include an alicyclic monofunctional (meth)acrylate monomer, a monofunctional (meth)acrylate monomer having a cyclic ether structure, a monofunctional (meth)acrylate monomer having a crosslinked condensed ring structure, an aliphatic group-containing monofunctional (meth)acrylate monomer, and an aromatic group-containing monofunctional (meth)acrylate monomer. In particular, the monofunctional (meth)acrylate monomer may be an alicyclic monofunctional (meth)acrylate monomer, a monofunctional (meth)acrylate monomer having a cyclic ether structure, or a monofunctional (meth) acrylate monomer having a crosslinked condensed ring structure. When such a monomer is used, the curability of the composition and the scratch resistance, stretchability, and adhesion of the coating film tend to be further improved.

The content of the monofunctional (meth)acrylate monomer may be 5 to 55 mass %, 10 to 50 mass %, 15 to 45 mass %, or 20 to 40 mass % based on the total amount of the composition. When the content of the monofunctional (meth)acrylate monomer is within the above-mentioned range, the curability of the composition and the scratch resistance, stretchability, and adhesion of the coating film tend to be further improved.

Examples of the monofunctional (meth)acrylate monomer are shown below, but the monofunctional (meth)acrylate monomer in the present embodiment is not limited to the following examples.

1.1.1.1. Alicyclic Monofunctional (Meth)Acrylate Monomer

The alicyclic monofunctional (meth)acrylate monomer is not particularly limited, and examples thereof include isobornyl (meth)acrylate (IBXA), trimethylcyclohexane (meth)acrylate (TMCHA), tert-butylcyclohexanol acrylate (TBCHA), and 2-(meth)acrylic acid-1,4-dioxaspiro[4,5]dec-2-ylmethyl. When vinyl methyl oxazolidinone and an alicyclic monofunctional (meth)acrylate monomer are both used, the adhesion and scratch resistance of the coating film tend to be further improved. Incidentally, in the present embodiment, the alicyclic monofunctional monomer is not a compound having a crosslinked condensed ring structure.

The content of the alicyclic monofunctional (meth)acrylate monomer may be 5 to 55 mass %, 10 to 50 mass %, or 15 to 45 mass % based on the total amount of the composition. When the content of the alicyclic monofunctional (meth)acrylate monomer is within the above-mentione range, the adhesion and scratch resistance of the coating film tend to be further improved.

1.1.1.2. Monofunctional (Meth)Acrylate Monomer having a Cyclic Ether Structure

The monofunctional (meth)acrylate monomer having a cyclic ether structure is not particularly limited, and examples thereof include tetrahydrofurfuryl acrylate (THFA), cyclic trimethylolpropane formal acrylate (CTFA), and (2-methyl-2-ethyl-1,3-dioxoran-4-yl)methyl acrylate (MEDOL-10). When vinyl methyl oxazolidinone and a monofunctional (meth)acrylate monomer having a cyclic ether structure are both used, the adhesion and scratch resistance of the coating film tend to be further improved. In addition, the odor of the composition tends to be decreased.

The content of the monofunctional (meth)acrylate monomer having a cyclic ether structure may be 5 to 55 mass %, 10 to 50 mass %, or 15 to 45 mass % based on the total amount of the composition. When the content of the monofunctional monomer having a cyclic ether structure is within the above-mentioned range, the adhesion and scratch resistance of the coating film tend to be further improved.

1.1.1.3. Monofunctional (Meth)Acrylate Monomer having a Crosslinked Condensed Ring Structure The term "crosslinked condensed ring structure" means a structure in which two or more ring structures share a side in a one-to-one manner and two or more non-adjacent atoms in a single ring structure or different ring structures are connected to each other. The monofunctional (meth)acrylate monomer having a crosslinked condensed ring structure is not particularly limited, and examples thereof include dicyclopentenyl (meth) acrylate, dicyclopentenyloxyethyl (meth) acrylate, and dicyclopentanyl (meth)acrylate. In addition, examples of the crosslinked condensed ring structure include, in addition to the above examples, those shown below. When vinyl methyl oxazolidinone and a monofunctional (meth)acrylate having a crosslinked condensed ring structure are both used, the adhesion and scratch resistance of the coating film tend to be further improved. In addition, the stretchability of the coating film tends to be further improved.

The content of the monofunctional (meth)acrylate monomer having a crosslinked condensed ring structure may be 5 to 45 mass %, 10 to 40 mass %, or 15 to 35 mass % based on the total amount of the composition. When the content of the monofunctional (meth)acrylate having a crosslinked condensed ring structure based on the total amount of the composition is within the above-mentioned range, the adhesion and scratch resistance of the coating film tend to be further improved.

1.1.1.4. Optional Monofunctional (Meth)Acrylate Monomer

The optional monofunctional (meth)acrylate monomer is not particularly limited, and examples thereof include aromatic group-containing monofunctional monomers and aliphatic group-containing monofunctional monomers. When such a monomer is used, the curability of the composition and the scratch resistance, stretchability, and adhesion of the coating film tend to be further improved.

1.1.1.4.1. Aliphatic Monofunctional (Meth)Acrylate Monomer

The aliphatic monofunctional (meth)acrylate monomer is not particularly limited, and examples thereof include isoamyl (meth)acrylate, stearyl (meth)acrylate, lauryl (meth) acrylate, octyl (meth)acrylate, decyl (meth)acrylate, isodecyl (meth)acrylate, isomyristyl (meth)acrylate, isostearyl (meth) acrylate, 2-hydroxybutyl (meth) acrylate, butoxyethyl (meth) acrylate, tetrahydrofurfuryl (meth)acrylate, 2-hydroxyethyl (meth)acrylate, and 2-hydroxypropyl (meth) acrylate.

1.1.1.4.2. Aromatic Group-Containing Monofunctional (Meth)Acrylate Monomer

The aromatic group-containing monofunctional monomer is not particularly limited, and examples thereof include phenoxyethyl (meth)acrylate, benzyl (meth)acrylate, alkoxylated 2-phenoxyethyl (meth) acrylate, ethoxylated nonylphenyl (meth) acrylate, alkoxylated nonylphenyl (meth) acrylate, p-cumylphenol EO-modified (meth) acrylate, and 2-hydroxy-3-phenoxypropyl (meth) acrylate.

1.1.2. Vinyl Methyl Oxazolidinone

The viscosity of the composition can be kept low by using vinyl methyl oxazolidinone, and the stretchability of the formed coating film is further improved. In addition, the adhesion and scratch resistance of the coating film can also be improved.

The content of the vinyl methyl oxazolidinone may be 3 to 40 mass %, 5 to 40 mass %, 10 to 35 mass %, or 15 to 30 mass % based on the total amount of the composition. When the content of the vinyl methyl oxazolidinone based on the total amount of the composition is within the above-mentioned range, the viscosity of the composition further decreases, and the stretchability, adhesion, and scratch resistance of the coating film tend to be further improved.

1.1.3. Nitrogen-Containing Monofunctional Monomer Other than Vinyl Methyl Oxazolidinone In addition to the vinyl methyl oxazolidinone, another nitrogen-containing monofunctional monomer may be included. The nitrogen-containing monofunctional monomer other than vinyl methyl oxazolidinone is not particularly limited, and examples thereof include nitrogen-containing monofunctional vinyl monomers, such as N-vinylcaprolactam, N-vinylformamide, N-vinylcarbazole, N-vinylacetamide, and N-vinylpyrolidone; nitrogen-containing monofunctional acrylate monomers, such as acryloylmorpholine; and nitrogen-containing monofunctional acrylamide monomers, such as (meth)acrylamide, N-hydroxymethyl(meth) acrylamide, diacetone acrylamide, N,N-dimethyl(meth) acrylamide, and (meth)acrylamides such as a dimethylaminoethylacrylate benzyl chloride quaternary salt.

In particular, either a nitrogen-containing monofunctional vinyl monomer or a nitrogen-containing monofunctional acrylate monomer may be included, or a monomer having a nitrogen-containing heterocyclic structure, such as N-vinylcaprolactam, N-vinylcarbazole, N-vinylpyrrolidone, or acryloylmorpholine, may be included, or further N-vinylcaprolactam may be included.

When such a nitrogen-containing monofunctional monomer is used, the scratch resistance of the coating film tends to be further improved. Furthermore, the nitrogen-containing monofunctional vinyl monomer having a nitrogen-containing heterocyclic structure, such as N-vinylcaprolactam, tends to further improve the flexibility and adhesion of the coating film.

The content of the nitrogen-containing monofunctional monomer other than the vinyl methyl oxazolidinone may be 1 to 15 mass %, 3 to 12 mass %, or 5 to 10 mass % based on the total amount of the composition. When the content of the nitrogen-containing monofunctional monomer based on the total amount of the composition is within the above-mentioned range, the adhesion and scratch resistance of the coating film tend to be further improved, while keeping the viscosity of the composition low.

1.1.4. Multifunctional Monomer

Examples of the multifunctional monomer of the present embodiment include vinyl ether group-containing (meth) acrylates and multifunctional (meth) acrylates. Incidentally, the multifunctional monomer is not limited to the above.

The content of the multifunctional monomer may be 5 to 50 mass %, 10 to 50 mass %, 15 to 45 mass %, or 20 to 40 mass % based on the total amount of the composition. When the content of the multifunctional monomer based on the total amount of the composition is within the above-mentioned range, the scratch resistance, stretchability, and adhesion of the coating film tend to be further improved.

Examples of the multifunctional monomer are shown below, but the multifunctional monomers in the present embodiment are not limited to the following examples.

1.1.4.1. Vinyl Ether Group-Containing (Meth)Acrylate

The vinyl ether group-containing (meth)acrylate is not particularly limited, and examples thereof include compounds represented by the following formula (1). When such a vinyl ether group-containing (meth)acrylate is included, the viscosity of the composition decreases, and the discharge stability tends to be further improved. In addition, the curability of the composition is further improved, and the recording speed can be further increased with the improvement in the curability.

$$H_2C=CR^1-CO-OR^2-O-CH=CH-R^3 \quad (1)$$

(where, $R^1$- is a hydrogen atom or a methyl group, $R^2$ is a divalent C2-C20 organic residue, and $R^3$ is a hydrogen atom or a monovalent C1-C11 organic residue).

In the formula (1), examples of the divalent C2-C20 organic residue represented by $R^2$ include an optionally substituted linear, branched, or cyclic C2-C20 alkylene group, an optionally substituted C2-C20 alkylene group having an oxygen atom forming an ether bond and/or an ester bond in the structure, and an optionally substituted divalent C6-C11 aromatic group. In particular, the divalent C2-C20 organic residue may be a C2-C6 alkylene group, such as an ethylene group, an n-propylene group, an isopropylene group, or a butylene group; or a C2-C9 alkylene group having an oxygen atom forming an ether bond in the structure, such as an oxyethylene group, an oxy-n-propylene group, an oxyisopropylene group, or an oxybutylene group. Furthermore, from the viewpoint of being capable of further reducing the viscosity of the composition and further improving the curability of the composition, the vinyl ether group-containing (meth)acrylate may be a compound having a glycol ether chain, in which $R^2$ is a C2-C9 alkylene group having an oxygen atom forming an ether bond in the structure, such as an oxyethylene group, an oxy-n-propylene group, an oxyisopropylene group, or an oxybutylene group.

In the formula (1), the monovalent C1-C11 organic residue represented by $R^3$ may be an optionally substituted linear, branched, or cyclic C1-C10 alkyl group or an optionally substituted C6-C11 aromatic group. In particular, C1-C2 alkyl group, such as a methyl group or an ethyl group, or a C6-C8 aromatic group, such as a phenyl group or a benzyl group, may be used.

When each of the above-mentioned organic residues is an optionally substituted group, the substituents are divided into groups containing carbon atoms and groups not containing carbon atoms. When the substituent is a group containing a carbon atom, the carbon atom is counted as the carbon atom of the organic residue. Examples of the group containing a carbon atom include, but not limited to, a carboxyl group and an alkoxy group. When the substituent is a group not containing a carbon atom, examples thereof include, but not limited to, a hydroxy group and a halo group.

Examples of the compound represented by the formula (1) include, but not limited to, 2-vinyloxyethyl (meth) acrylate, 3-vinyloxypropyl (meth) acrylate, 1-methyl-2-vinyloxyethyl (meth) acrylate, 2-vinyloxypropyl (meth) acrylate, 4-vinyloxybutyl (meth) acrylate, 1-methyl-3-vinyloxypropyl (meth) acrylate, 1-vinyloxymethylpropyl (meth) acrylate, 2-methyl-3-vinyloxypropyl (meth) acrylate, 1,1-dimethyl-2-vinyloxyethyl (meth) acrylate, 3-vinyloxybutyl (meth) acrylate, 1-methyl-2-vinyloxypropyl (meth) acrylate, 2-vinyloxybutyl (meth) acrylate, 4-vinyloxycyclohexyl (meth)acrylate, 6-vinyloxyhexyl (meth)acrylate, 4-vinyloxymethylcyclohexylmethyl (meth) acrylate, 3-vinyloxymethylcyclohexylmethyl (meth) acrylate, 2-vinyloxymethylcyclohexylmethyl (meth) acrylate, p-vinyloxymethylphenylmethyl (meth) acrylate, m-vinyloxymethylphenylmethyl (meth) acrylate, o-vinyloxymethylphenylmethyl (meth) acrylate, 2-(2-vinyloxyethoxy)ethyl (meth) acrylate, 2-(vinyloxyisopropoxy) ethyl (meth) acrylate, 2-(vinyloxyethoxy) propyl (meth) acrylate, 2-(vinyloxyethoxy) isopropyl (meth) acrylate, 2-(vinyloxyisopropoxy) propyl (meth) acrylate, 2-(vinyloxyisopropoxy) isopropyl (meth) acrylate, 2-(vinyloxyethoxyethoxy) ethyl (meth) acrylate, 2-(vinyloxyethoxyisopropoxy)ethyl (meth) acrylate, 2-(vinyloxyisopropoxyethoxy)ethyl (meth) acrylate, 2-(vinyloxyisopropoxyisopropoxy)ethyl (meth) acrylate, 2-(vinyloxyethoxyethoxy) propyl (meth) acrylate, 2-(vinyloxyethoxyisopropoxy)propyl (meth) acrylate, 2-(vinyloxyisopropoxyethoxy)propyl (meth) acrylate, 2-(vinyloxyisopropoxyisopropoxy)propyl (meth) acrylate, 2-(vinyloxyethoxyethoxy) isopropyl (meth)acrylate, 2-(vinyloxyethoxyisopropoxy)isopropyl (meth)acrylate, 2-(vinyloxyisopropoxyethoxy)isopropyl (meth) acrylate, 2-(vinyloxyisopropoxyisopropoxy)isopropyl (meth) acrylate, 2-(vinyloxyethoxyethoxyethoxy)ethyl (meth) acrylate, 2-(vinyloxyethoxyethoxyethoxyethoxy)ethyl (meth) acrylate, 2-(isopropenoxyethoxy) ethyl (meth) acrylate, 2-(isopropenoxyethoxyethoxy) ethyl (meth) acrylate, 2-(isopropenoxyethoxyethoxyethoxy)ethyl (meth) acrylate, 2-(isopropenoxyethoxyethoxyethoxyethoxy)ethyl (meth) acrylate, polyethylene glycol monovinyl ether (meth)acrylate, and polypropylene glycol monovinyl ether (meth) acrylate. Among these examples, in particular, the compound may be 2-(2-vinyloxyethoxy) ethyl acrylate because it is easy to balance between the curability and the viscosity of the composition. Incidentally, in the present embodiment, 2-(2-vinyloxyethoxy) ethyl acrylate may also be referred to as VEEA.

The content of the vinyl ether group-containing (meth) acrylate may be 5 to 50 mass %, 10 to 50 mass %, 15 to 45 mass %, or 20 to 40 mass % based on the total amount of the composition. When the content of the vinyl ether group-containing (meth)acrylate is 5 mass % or more based on the total amount of the composition, the curability is further improved, the viscosity of the composition decreases, and the discharge stability tends to be further improved. In addition, when the content of the vinyl ether group-containing (meth)acrylate is 50 mass % or less based on the total amount of the composition, the adhesion of the coating film tends to be further improved.

1.1.4.2. Multifunctional (Meth)Acrylate

When a multifunctional (meth)acrylate is used, the curability tends to be further improved. The multifunctional (meth)acrylate is not particularly limited, and examples thereof include difunctional (meth)acrylates, such as dipropylene glycol di(meth)acrylate (DPGDA), diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate (TPGDA), polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate (NPGDA), propoxylated (2) neopentyl glycol di(meth)acrylate (NPG(2PO)DA), dimethylol-tricyclodecane di(meth) acrylate, bisphenol A EO (ethylene oxide) adduct di(meth)

acrylate, bisphenol A PO (propylene oxide) adduct di(meth)acrylate, hydroxypivalic acid neopentyl glycol di(meth)acrylate, and polytetramethylene glycol di(meth)acrylate; and tri- or higher multifunctional (meth)acrylates, such as trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate. In particular, tripropylene glycol di(meth)acrylate (TPGDA) or propoxylated (2) neopentyl glycol di(meth)acrylate (NPG(2PO)DA) may be used.

The content of the multifunctional (meth)acrylate may be 2 to 20 mass %, 2 to 15 mass %, or 2 to 10 mass % based on the total amount of the composition. When the content of the multifunctional (meth)acrylate based on the total amount of the composition is within the above-mentioned range, the curability tends to be further improved.

1.1.5. Oligomer

The oligomer of the present embodiment is a multimer including a polymerizable compound as a constituent component and is a compound including one or more polymerizable functional groups. The polymerizable compound referred here is not limited to the above-mentioned monofunctional monomers and multifunctional monomers. In the present embodiment, a polymerizable compound having a molecular weight of 1000 or more is defined as an oligomer, and a polymerizable compound having a molecular weight of 1000 or less is defined as a monomer.

Such an oligomer is not particularly limited, and examples thereof include a urethane acrylate oligomer having a repeating structure of urethane, an ester acrylate oligomer having a repeating structure of ester, and an epoxy acrylate oligomer having a repeating structure of epoxy.

In particular, the oligomer may be a urethane acrylate oligomer, for example, an aliphatic urethane acrylate oligomer, an aromatic urethane acrylate oligomer, in particular, an aliphatic urethane acrylate oligomer. In addition, the urethane acrylate oligomer may be a tetra- or lower functional urethane acrylate oligomer, in particular, a difunctional urethane acrylate oligomer. When such an oligomer is used, the viscosity further decreases, and the curability and adhesion tend to be further improved.

The content of the oligomer may be 1 to 15 mass %, 1 to 10 mass %, or 2 to 7 mass % based on the total amount of the composition. When the content of the oligomer based on the total amount of the composition is within the above-mentioned range, the viscosity further decreases, and the curability and adhesion tend to be further improved.

1.2. Photopolymerization Initiator

The photopolymerization initiator may be any initiator that generates an active species by irradiation with radioactive rays, and examples thereof include known photopolymerization initiators, such as an acylphosphine oxide-based photopolymerization initiator, an alkylphenone-based polymerization initiator, a titanocene-based polymerization initiator, and a thioxanthone-based photopolymerization initiator. In particular, the initiator may be an acylphosphine oxide-based photopolymerization initiator or a thioxanthone-based photopolymerization initiator, in particular, an acylphosphine oxide-based photopolymerization initiator. When such a photopolymerization initiator is used, the curability of the composition is further improved, in particular, the curability in the curing process by light from a UV-LED tends to be further improved. A single photopolymerization initiator may be used, or a combination of two or more polymerization initiators may be used.

The content of the photopolymerization initiator may be 3 to 17 mass %, 5 to 15 mass %, or 7 to 12 mass % based on the total amount of the composition. When the content of the photopolymerization initiator is within the above-mentioned range, the curability of the composition and the solubility of the photopolymerization initiator tend to be further improved.

1.2.1. Acylphosphine Oxide-Based Photopolymerization Initiator

The acylphosphine oxide-based photopolymerization initiator is not particularly limited, and examples thereof include 2,4,6-trimethylbenzoyl diphenylphosphine oxide, bis(2,4,6-trimethylbenzoyl)-phenylphosphine oxide, and bis(2,6-dimethoxybenzoyl)-2,4,4-trimethylpentylphosphine oxide.

Examples of commercial products of the acylphosphine oxide-based photopolymerization initiator include Omnirad 819 (bis(2,4,6-trimethylbenzoyl)-phenylphosphine oxide), IRGACURE 1800 (a mixture of bis(2,6-dimethoxybenzoyl)-2,4,4-trimethylpentylphosphine oxide and 1-hydroxycyclohexyl-phenylketone at a mass ratio of 25:75), and SpeedCure TPO (2,4,6-trimethylbenzoyl diphenylphosphine oxide).

The content of the acylphosphine oxide-based photopolymerization initiator may be 3 to 15 mass %, 5 to 12 mass %, or 7 to 10 mass % based on the total amount of the composition. When the content of the acylphosphine oxide-based photopolymerization initiator is within the above-mentioned range, the curability of the composition and the solubility of the photopolymerization initiator tend to be further improved.

1.2.2. Thioxanthone-Based Photopolymerization Initiator

The thioxanthone-based photopolymerization initiator is not particularly limited, and examples thereof include thioxanthone, 2-methylthioxanthone, 2,4-diethylthioxanthone, 2-iropropylthioxanthone, 4-isopropylthioxanthone, and 2-chlorothioxanthone.

Examples of commercial products of the thioxanthone compound include SpeedCure DETX (2,4-diethylthioxanthone).

The content of the thioxanthone-based photopolymerization initiator may be 1 to 5 mass % or 1 to 3 mass % based on the total amount of the composition. When the content of the thioxanthone-based photopolymerization initiator is within the above-mentioned range, the curability of the composition tends to be further improved.

1.3. Fluorescent Whitener

The fluorescent whitener is not particularly limited but, for example, can absorb light having a wavelength of about 300 to 450 nm and emit light having a wavelength of about 400 to 500 nm. Such fluorescent whiteners are not particularly limited, and examples thereof include naphthalene benzoxazolyl derivatives, thiophene benzoxazolyl derivatives, stilbene benzoxazolyl derivatives, coumarin derivatives, styrene biphenyl derivatives, pyrazolone derivatives, stilbene derivatives, styryl derivatives of benzene and biphenyl, bis(benzazol-2-yl) derivatives, carbostyril, naphthalimide, derivatives of dibenzothiophene-5,5'-dioxide, pyrene derivatives, and pyridotriazole. These fluorescent whiteners may be used alone or in combination of two or more thereof.

Examples of commercial products of the fluorescent whitener include Telalux OB and Telalux KCB.

The content of the fluorescent whitener may be 0.1 to 1 mass % or 0.1 to 0.5 mass % based on the total amount of the composition. When the content of the fluorescent whitener is within the above-mentioned range, the curability of the composition tends to be further improved.

1.4. Polymerization Inhibitor

Examples of the polymerization inhibitor include, but not limited to, p-methoxyphenol, hydroquinone monomethyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), hindered amine compounds, 2,2,6,6-tetramethylpiperidinyl-1-oxyl (TEMPO), and derivatives of 2,2,6,6-tetramethylpiperidinyl-1-oxyl.

In particular, 2,2,6,6-tetramethylpiperidinyl-1-oxyl or its derivative may be used. The derivative of 2,2,6,6-tetramethylpiperidinyl-1-oxyl is not particularly limited, and examples thereof include 4-acetamide-2,2,6,6-tetramethylpiperidinyl-1-oxyl, 4-amino-2,2,6,6-tetramethylpiperidinyl-1-oxyl, 4-carboxy-2,2,6,6-tetramethylpiperidinyl-1-oxyl, 4-(2-chloroacetamide)-2,2,6,6-tetramethylpiperidinyl-1-oxyl, 4-cyano-2,2,6,6-tetramethylpiperidinyl-1-oxyl, 4-hydroxy-2,2,6,6-tetramethylpiperidinyl-1-oxyl, 4-hydroxybenzoate-2,2,6,6-tetramethylpiperidinyl-1-oxyl, 4-(2-iodoacetamide)-2,2,6,6-tetramethylpiperidinyl-1-oxyl, 4-isothiocyanate-2,2,6,6-tetramethylpiperidinyl-1-oxyl, 4-methacryloyloxy-2,2,6,6-tetramethylpiperidinyl-1-oxyl, 4-methoxy-2,2,6,6-tetramethylpiperidinyl-1-oxyl, 4-oxo-2,2,6,6-tetramethylpiperidinyl-1-oxyl, and 4-(2-propynyloxy)-2,2,6,6-tetramethylpiperidinyl-1-oxyl. In particular, 4-hydroxy-2,2,6,6-tetramethylpiperidinyl-1-oxyl may be used. When such a polymerization inhibitor is used, the storage stability of the composition tends to be further improved.

The content of the polymerization inhibitor may be 0.1 to 0.5 mass % or 0.1 to 0.3 mass % based on the total amount of the composition. When the content of the polymerization inhibitor is within the above-mentioned range, the storage stability of the composition tends to be further improved.

1.5. Surfactant

The surfactant is not particularly limited, and examples thereof include an acetylene glycol-based surfactant, a fluorine-based surfactant, and a silicone-based surfactant.

The acetylene glycol-based surfactant is not particularly limited, and examples thereof include 2,4,7,9-tetramethyl-5-decine-4,7-diol and alkylene oxide adducts of 2,4,7,9-tetramethyl-5-decine-4,7-diol and 2,4-dimethyl-5-decin-4-ol and alkylene oxide adducts of 2,4-dimethyl-5-decin-4-ol.

The fluorine-based surfactant is not particularly limited, and examples thereof include perfluoroalkyl sulfonates, perfluoroalkyl carboxylates, perfluoroalkyl phosphates, perfluoroalkyl ethylene oxide adducts, perfluoroalkyl betaines, and perfluoroalkylamine oxide compounds.

Examples of the silicone-based surfactant include polysiloxane compounds, polyester-modified silicone, and polyether-modified organosiloxane. Examples of the polyester-modified silicone include BYK-347 and 348 and BYK-UV 3500, 3510, and 3530 (manufactured by BYK Additives & Instruments), and examples of the polyether-modified silicone include BYK-3570 (manufactured by BYK Additives & Instruments).

The content of the surfactant may be 0.1 to 1 mass % or 0.2 to 0.8 mass % based on the total amount of the composition. When the content of the surfactant is within the above-mentioned range, the wettability of the composition tends to be further improved.

1.6. Other Components

The radiation-curable ink jet composition according to the present embodiment may further include additives, for example, a color material such as a pigment or a dye and a dispersant for the pigment or the like, as necessary.

1.7. Method for Manufacturing Composition

The radiation-curable ink jet composition is manufactured (prepared) by mixing each component that will be included in the composition and sufficiently stirring the mixture until uniform. In the present embodiment, the preparation of the radiation-curable ink jet composition may include a step of subjecting a mixture of a polymerization initiator and at least a part of monomers to ultrasonication and/or warming treatment in the process of preparation. Consequently, the amount of dissolved oxygen in the prepared composition can be decreased, and the radiation-curable ink jet composition can have excellent discharge stability and storage stability. The mixture may further include another component that will be included in the radiation-curable ink jet composition, as long as the mixture includes at least the above-mentioned components, or may include all components of the radiation-curable ink jet composition. The monomer included in the mixture may be at least a part of the monomers that will be included in the radiation-curable ink jet composition.

2. Ink Jet Method

The ink jet method according to the present embodiment includes a discharge step of discharging the radiation-curable ink jet composition using a prescribed liquid jet head to adhere the composition to a recording medium and an irradiation step of irradiating the radiation-curable ink jet composition adhered to the recording medium with radioactive rays.

2.1. Discharge Step

In the discharge step, a heated composition is discharged from a liquid jet head and is adhered to a recording medium. More specifically, a pressure-generating unit is driven to discharge the composition filling a pressure-generating chamber of the liquid jet head from a nozzle. This discharge method is also referred to as an ink jet method.

Examples of the liquid jet head 10 that is used in the discharge step include a line head that performs recording by a line system and a serial head that performs recording by a serial system.

In the line system using a line head, for example, a liquid jet head having a width not narrower than the recording width of a recording medium is fixed to an ink jet apparatus. A recording medium is moved along the sub-scanning direction (the vertical direction or the transportation direction of the recording medium), and ink droplets are discharged from a nozzle of the liquid jet head in conjunction with this movement to record an image on the recording medium.

In the serial system using a serial head, for example, a liquid jet head is mounted on a carriage that is movable in the width direction of an recording medium. The carriage is moved along the main-scanning direction (the horizontal direction or width direction of the recording medium), and ink droplets are discharged from a nozzle opening of the head in conjunction with this movement to record an image on the recording medium.

2.2. Irradiation Step

In the irradiation step, the radiation-curable ink jet composition adhered to the recording medium is irradiated with radioactive rays. Polymerization of monomers is initiated by the irradiation with radioactive rays to cure the composition, resulting in formation of a coating film. On this occasion, if a polymerization initiator is present, an active species (initiating species), such as a radical, an acid, or a base, is generated, and the polymerization of monomers is promoted by the function of the initiating species. In addition, if a photosensitizer is present, the photosensitizer absorbs radioactive rays to become an excited state and comes into contact with the polymerization initiator to promote the decomposition of the polymerization initiator. Consequently, the curing reaction can be further achieved.

Here, examples of the radioactive rays include ultraviolet rays, infrared rays, visible rays, and X-rays. A radiation source is disposed downstream the liquid jet head and irradiates the composition with the radioactive rays. The radiation source is not particularly limited, and examples thereof include an ultraviolet light-emitting diode. The use of such a radiation source can achieve downsizing of the apparatus and a reduction in cost. The ultraviolet light-emitting diode as an ultraviolet ray source is small sized and can be attached to the inside of the ink jet apparatus.

For example, the ultraviolet light-emitting diode can be attached to the carriage (both ends along the medium width direction and/or the medium transporting direction side) on which the liquid jet head that discharges the radiation-curable ink jet composition is mounted. Furthermore, curing can be achieved with low energy at a high speed due to the above-described composition of the radiation-curable ink jet composition. The irradiation energy is calculated by multiplying the irradiation time by the irradiation intensity. Accordingly, the irradiation time can be shortened, and the printing speed is increased. Alternatively, the irradiation intensity may be decreased. Consequently, an increase in the temperature of printed matter can be decreased, leading to low odor of the cured film.

3. Ink Jet Apparatus

The ink jet apparatus of the present embodiment includes a liquid jet head including a nozzle discharging a composition and a pressure chamber to which the composition is supplied; and a radiation source irradiating the composition with radioactive rays, wherein the above-described radiation-curable ink jet composition is used as the composition. In addition, the ink jet apparatus may include a heating unit that heats the composition in the liquid jet head or in the ink flow passage or on the recording medium.

Figure 1:
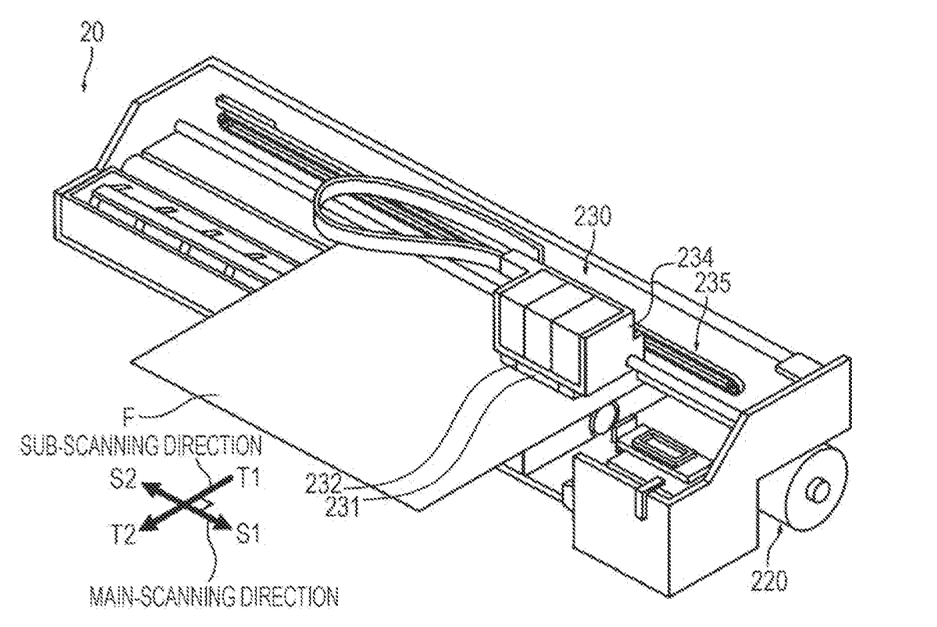
FIG. 1 is a perspective view illustrating an ink jet apparatus of a serial system of an embodiment.

As an example of the ink jet apparatus, a perspective view of a serial printer is shown in FIG. 1. As shown in FIG. 1, the serial printer 20 includes a transportation unit 220 and a recording unit 230. The transportation unit 220 transports a recording medium F fed to the serial printer to the recording unit 230 and ejects the recording medium after recording to the outside of the serial printer. Specifically, the transportation unit 220 includes feed rollers and transports the fed recording medium F to the sub-scanning direction T1.

The recording unit 230 includes an ink jet head 231 that discharges a composition to a recording medium F fed from the transportation unit 220; a radiation source 232 that irradiates the adhered composition with radioactive rays; a carriage 234 on which the ink jet head 231 and the radiation source 232 are mounted; and a carriage moving mechanism 235 for moving the carriage 234 to the main-scanning direction S1, S2 of the recording medium F.

A serial printer includes a head having a length smaller than the width of a recording medium as the ink jet head 131.

The head moves to perform recording by a plurality of passes (multi-pass). In the serial printer, the head 231 and the radiation source 232 are mounted on the carriage 234 that moves in a predetermined direction, and the head moves with the movement of the carriage and discharges a composition onto a recording medium. Consequently, recording is performed by two or more passes (multi-pass). Incidentally, the pass is also called main-scanning. Sub-scanning for transporting a recording medium is performed between passes. That is, main-scanning and sub-scanning are alternately performed.

Incidentally, FIG. 1 shows an aspect in which a radiation source is mounted on a carriage. However, the printer is not limited to this and may include a radiation source not mounted on the carriage.

In addition, the ink jet apparatus of the present embodiment is not limited to the serial system printer and may be the line system printer.

4. Recorded Matter

The recorded matter of the present embodiment is made of the radiation-curable ink jet composition adhered on a recording medium and cured thereon. Since the composition provides good stretchability and adhesion, cracking and chipping of the coating film can be prevented during post processing, such as cutting and bending. Accordingly, the recorded matter of the present embodiment can be suitably used in, for example, sign application.

The material of the recording medium is not particularly limited, and examples thereof include plastics, such as polyvinyl chloride, polyethylene terephthalate, polypropylene, polyethylene, polycarbonate, cellulose diacetate, cellulose triacetate, cellulose propionate, cellulose butyrate, cellulose acetate butyrate, cellulose nitrate, polystyrene, and polyvinylacetal, and these plastics whose surfaces are processed; glass; paper; metals; and wood.

EXAMPLES

The present disclosure will now be more specifically described by examples and comparative examples but is not limited to the following examples.

1. Preparation of Ink Jet Composition

A pigment, a dispersant, and VEEA were weighed and put in a tank for pigment dispersion, and ceramic beads having a diameter of 1 mm were put in the tank, followed by stirring to prepare a pigment dispersion in which a pigment was dispersed in a monomer.

Subsequently, the remaining monomers, a polymerization initiator, and a polymerization inhibitor were put in a mixture tank made of stainless steel to give the respective compositions shown in Tables 1 and 2 and were mixed and stirred to be completely dissolved. The pigment dispersion prepared above was then added to the tank, followed by further mixing and stirring at ordinary temperature for 1 hour and further filtration through a membrane filter having a pore size of 5 μm to obtain the radiation-curable ink jet compositions of each example. The numerical value of each component of each example shown in the tables represents mass % unless otherwise specified. In addition, good recording was verified by recording with each of the ink jet compositions shown in Tables 1 and 2 on a polycarbonate film using an ink jet printer as shown in FIG. 1.

TABLE 1

| | | Example | | | | | | | | |
|---|---|---|---|---|---|---|---|---|---|---|
| | | 1 | 2 | 3 | 4 | 5 | 6 | 7 | 8 | 9 |
| Pigment dispersion | Pigment (PB 15:3) | 2.5 | 2.5 | 2.5 | 2.5 | 2.5 | 2.5 | 2.5 | 2.5 | 2.5 |
| | Dispersant | 1.5 | 1.5 | 1.5 | 1.5 | 1.5 | 1.5 | 1.5 | 1.5 | 1.5 |
| | VEEA | 6 | 6 | 6 | 6 | 6 | 6 | 6 | 6 | 6 |
| Vinyl methyl oxazolidinone | VMOX | 20 | 20 | 20 | 20 | 20 | 20 | 20 | 20 | 15 |
| Aliphatic monofunctional (meth)acrylate | IBXA | 28 | | | | | | | | 23 |
| | TMCHA | | 28 | | | | | | | |
| Monofunctional (meth)acylate having a cyclic ether structure | CTFA | | | 28 | | | | | | |
| | THFA | | | | 28 | | | | | |
| | MEDOL-10 | | | | | 28 | | | | |
| Monofunctional (meth)acrylate having a crosslinked condensed ring structure | FA-511AS | | | | | | 28 | | | |
| | FA-512AS | | | | | | | 28 | | |
| | FA-513AS | | | | | | | | 28 | |
| Multifunctional monomer | NPG (2PO) DA | | | | | | | | | 5 |
| | TPGDA | | | | | | | | | |
| | VEEA | 30 | 30 | 30 | 30 | 30 | 30 | 30 | 30 | 30 |
| Oligomer | EC6101 | | | | | | | | | 5 |
| | CN9893 | | | | | | | | | |
| Photopolymerization initiator | Omnirad 819 | 5 | 5 | 5 | 5 | 5 | 5 | 5 | 5 | 5 |
| | SpeedcureTPO | 4 | 4 | 4 | 4 | 4 | 4 | 4 | 4 | 4 |
| | SpeedcureDETX | 2 | 2 | 2 | 2 | 2 | 2 | 2 | 2 | 2 |
| Fluorescent whitener | TELALUX OB | 0.2 | 0.2 | 0.2 | 0.2 | 0.2 | 0.2 | 0.2 | 0.2 | 0.2 |
| Surfactant | BYK-UV3500 | 0.6 | 0.6 | 0.6 | 0.6 | 0.6 | 0.6 | 0.6 | 0.6 | 0.6 |
| Polymerization inhibitor | LA-7RD | 0.02 | 0.02 | 0.02 | 0.02 | 0.02 | 0.02 | 0.02 | 0.02 | 0.02 |
| | MEHQ | 0.18 | 0.18 | 0.18 | 0.18 | 0.18 | 0.18 | 0.18 | 0.18 | 0.18 |
| Total | | 100 | 100 | 100 | 100 | 100 | 100 | 100 | 100 | 100 |
| Evaluation | Viscosity | A | A | A | AA | A | A | A | A | A |
| | Curability | A | A | A | A | A | A | A | A | AA |
| | Adhesion | A | A | A | A | A | A | A | A | A |
| | Scratch resistance | AA | A | AA | A | A | A | A | A | AA |
| | Stretchability | A | A | A | A | A | A | A | A | A |
| | Storage stability | A | A | A | A | A | A | A | A | A |

| | | Example | | | | | | | | |
|---|---|---|---|---|---|---|---|---|---|---|
| | | 10 | 11 | 12 | 13 | 14 | 15 | 16 | 17 | 18 |
| Pigment dispersion | Pigment (PB 15:3) | 2.5 | 2.5 | 2.5 | 2.5 | 2.5 | 2.5 | 2.5 | 2.5 | 2.5 |
| | Dispersant | 1.5 | 1.5 | 1.5 | 1.5 | 1.5 | 1.5 | 1.5 | 1.5 | 1.5 |
| | VEEA | 6 | 6 | 6 | 6 | 6 | 6 | 6 | 6 | 6 |
| Vinyl methyl oxazolidinone | VMOX | 15 | 15 | 15 | 24 | 20 | 5 | 35 | 30 | 15 |
| Aliphatic monofunctional (meth)acrylate | IBXA | 20 | 20 | | 28 | | 20 | 15 | 5 | 45 |
| | TMCHA | | | | | | | | | |
| Monofunctional (meth)acylate having a cyclic ether structure | CTFA | 13 | | 20 | 10 | 18 | 18 | 15 | | |
| | THFA | | | | | | | | | |
| | MEDOL-10 | | | | | | | | | |
| Monofunctional (meth)acrylate having a crosslinked condensed ring structure | FA-511AS | | 13 | 13 | 10 | | | | | |
| | FA-512AS | | | | | | | | | |
| | FA-513AS | | | | | | | | | |
| Multifunctional monomer | NPG (2PO) DA | | | | | | | | 3 | |
| | TPGDA | | | | | | | | | |
| | VEEA | 30 | 30 | 30 | 6 | 40 | 35 | 13 | 40 | 18 |
| Oligomer | EC6101 | | | | | | | | | |
| | CN9893 | | | | | | | | | |
| Photopolymerization initiator | Omnirad 819 | 5 | 5 | 5 | 5 | 5 | 5 | 5 | 5 | 5 |
| | SpeedcureTPO | 4 | 4 | 4 | 4 | 4 | 4 | 4 | 4 | 4 |
| | SpeedcureDETX | 2 | 2 | 2 | 2 | 2 | 2 | 2 | 2 | 2 |
| Fluorescent whitener | TELALUX OB | 0.2 | 0.2 | 0.2 | 0.2 | 0.2 | 0.2 | 0.2 | 0.2 | 0.2 |

TABLE 1-continued

| | | | | | | | | | | |
|---|---|---|---|---|---|---|---|---|---|---|
| Surfactant | BYK-UV3500 | 0.6 | 0.6 | 0.6 | 0.6 | 0.6 | 0.6 | 0.6 | 0.6 | 0.6 |
| Polymerization inhibitor | LA-7RD | 0.02 | 0.02 | 0.02 | 0.02 | 0.02 | 0.02 | 0.02 | 0.02 | 0.02 |
| | MEHQ | 0.18 | 0.18 | 0.18 | 0.18 | 0.18 | 0.18 | 0.18 | 0.18 | 0.18 |
| | Total | 100 | 100 | 100 | 100 | 100 | 100 | 100 | 100 | 100 |
| Evaluation | Viscosity | A | A | A | B | AA | A | AA | A | B |
| | Curability | A | A | A | B | A | A | A | A | A |
| | Adhesion | A | A | A | A | A | B | A | A | B |
| | Scratch resistance | A | A | A | A | A | A | A | C | AA |
| | Stretchability | A | A | A | A | B | A | A | B | A |
| | Storage stability | A | A | A | A | A | A | A | A | A |

TABLE 2

| | | Example | | | | | | | | | |
|---|---|---|---|---|---|---|---|---|---|---|---|
| | | 19 | 20 | 21 | 22 | 23 | 24 | 25 | 26 | 27 | 28 |
| Pigment dispersion | Pigment (PB 15:3) | 2.5 | 2.5 | 2.5 | 2.5 | 2.5 | 2.5 | 2.5 | 2.5 | 2.5 | 2.5 |
| | Dispersant | 1.5 | 1.5 | 1.5 | 1.5 | 1.5 | 1.5 | 1.5 | 1.5 | 1.5 | 1.5 |
| | VEEA | 6 | 6 | 6 | 6 | 6 | 6 | 6 | 6 | 6 | 6 |
| Vinyl methyl oxazolidinone | VMOX | 30 | 15 | 30 | 15 | 15 | 15 | 15 | 20 | 20 | 30 |
| Aliphatic monofunctional (meth)acrylate | IBXA | | | | | 23 | 23 | 23 | 20 | 9 | 2 |
| | TMCHA | | | | | | | | | | |
| Monofunctional (meth)acylate having a cyclic ether structure | CTFA | 5 | 45 | | | | | | 20 | | |
| | THFA | | | | | | | | | | |
| | MEDOL-10 | | | | | | | | | | |
| Monofunctional (meth)acrylate having a crosslinked condensed ring structure | FA-511AS | | | | 5 | 45 | | | 13 | | |
| | FA-512AS | | | | | | | | | | |
| | FA-513AS | | | | | | | | | | |
| Multifunctional monomer | NPG (2PO) DA | 3 | | 3 | | 5 | 5 | | 5 | | 3 |
| | TPGDA | | | | | | | 5 | | | |
| | VEEA | 40 | 18 | 40 | 18 | 32 | 23 | 32 | | 49 | 43 |
| Oligomer | EC6101 | | | | | 3 | 12 | | | | |
| | CN9893 | | | | | | | 3 | | | |
| Photopolymerization initiator | Omnirad 819 | 5 | 5 | 5 | 5 | 5 | 5 | 5 | 5 | 5 | 5 |
| | SpeedcureTPO | 4 | 4 | 4 | 4 | 4 | 4 | 4 | 4 | 4 | 4 |
| | SpeedcureDETX | 2 | 2 | 2 | 2 | 2 | 2 | 2 | 2 | 2 | 2 |
| Fluorescent whitener | TELALUX OB | 0.2 | 0.2 | 0.2 | 0.2 | 0.2 | 0.2 | 0.2 | 0.2 | 0.2 | 0.2 |
| Surfactant | BYK-UV3500 | 0.6 | 0.6 | 0.6 | 0.6 | 0.6 | 0.6 | 0.6 | 0.6 | 0.6 | 0.6 |
| Polymerization inhibitor | LA-7RD | 0.02 | 0.02 | 0.02 | 0.02 | 0.02 | 0.02 | 0.02 | 0.02 | 0.02 | 0.02 |
| | MEHQ | 0.18 | 0.18 | 0.18 | 0.18 | 0.18 | 0.18 | 0.18 | 0.18 | 0.18 | 0.18 |
| | Total | 100 | 100 | 100 | 100 | 100 | 100 | 100 | 100 | 100 | 100 |
| Evaluation | Viscosity | A | B | A | B | B | C | C | C | A | A |
| | Curability | A | A | A | A | A | A | A | B | A | A |
| | Adhesion | B | A | A | B | A | AA | B | A | B | B |
| | Scratch resistance | A | B | A | A | A | A | A | A | A | C |
| | Stretchability | B | A | B | A | B | C | C | AA | C | C |
| | Storage stability | A | A | A | A | A | A | A | A | A | A |

| | | Example | | | | | | | Comparative Example | |
|---|---|---|---|---|---|---|---|---|---|---|
| | | 29 | 30 | 31 | 32 | 33 | 34 | 35 | 1 | 2 |
| Pigment dispersion | Pigment (PB 15:3) | 2.5 | 2.5 | 2.5 | 2.5 | 2.5 | 2.5 | 2.5 | 2.5 | 2.5 |
| | Dispersant | 1.5 | 1.5 | 1.5 | 1.5 | 1.5 | 1.5 | 1.5 | 1.5 | 1.5 |
| | VEEA | 6 | 6 | 6 | 6 | 6 | 6 | 6 | 6 | 6 |
| Vinyl methyl oxazolidinone | VMOX | 15 | 30 | 15 | 30 | 15 | 20 | 20 | | 20 |
| Aliphatic monofunctional (meth)acrylate | IBXA | 55 | | | | | 28 | 28 | 25 | |
| | TMCHA | | | | | | | | | |
| Monofunctional (meth)acylate having a cyclic ether structure | CTFA | | | 2 | 55 | | | | | |
| | THFA | | | | | | | | | |
| | MEDOL-10 | | | | | | | | | |

TABLE 2-continued

| | | 1 | 2 | 3 | 4 | 5 | 6 | 7 | 8 | 9 |
|---|---|---|---|---|---|---|---|---|---|---|
| Monofunctional (meth)acrylate having a crosslinked condensed ring structure | FA-511AS FA-512AS FA-513AS | | | | 2 | 55 | | | 20 | |
| Multifunctional monomer | NPG (2PO) DA | | | 3 | | 3 | | | 10 | 20 |
| | TPGDA | | | | | | | | | 15 |
| | VEEA | 8 | 43 | 8 | 43 | 8 | 30.01 | 30.02 | 23 | 23 |
| Oligomer | EC6101 | | | | | | | | | |
| | CN9893 | | | | | | | | | |
| Photopolymerization initiator | Omnirad 819 | 5 | 5 | 5 | 5 | 5 | 5 | 5 | 5 | 5 |
| | SpeedcureTPO | 4 | 4 | 4 | 4 | 4 | 4 | 4 | 4 | 4 |
| | SpeedcureDETX | 2 | 2 | 2 | 2 | 2 | 2 | 2 | 2 | 2 |
| Fluorescent whitener | TELALUX OB | 0.2 | 0.2 | 0.2 | 0.2 | 0.2 | 0.2 | 0.2 | 0.2 | 0.2 |
| Surfactant | BYK-UV3500 | 0.6 | 0.6 | 0.6 | 0.6 | 0.6 | 0.6 | 0.6 | 0.6 | 0.6 |
| Polymerization inhibitor | LA-7RD | 0.02 | 0.02 | 0.02 | 0.02 | 0.02 | 0.01 | | 0.02 | 0.02 |
| | MEHQ | 0.18 | 0.18 | 0.18 | 0.18 | 0.18 | 0.18 | 0.18 | 0.18 | 0.18 |
| | Total | 100 | 100 | 100 | 100 | 100 | 100 | 100 | 100 | 100 |
| Evaluation | Viscosity | C | A | C | A | C | A | A | D | C |
| | Curability | A | A | A | A | A | A | A | B | B |
| | Adhesion | A | B | A | B | A | A | A | C | A |
| | Scratch resistance | AA | C | A | C | A | AA | AA | C | A |
| | Stretchability | A | C | A | C | A | A | A | C | D |
| | Storage stability | A | A | A | A | A | B | C | A | A |

Pigment
Pigment Blue 15:3 (PB 15:3)
Dispersant
Solsperse 36000 (manufactured by The Lubrizol Corporation, polymer dispersant)
Vinyl methyl oxazolidinone
VMOX (vinyl methyl oxazolidinone, manufactured by BASF SE)
Monofunctional (meth)acrylate monomer
IBXA (manufactured by Osaka Organic Chemical Industry Ltd., isobornyl acrylate)
TMCHA (trade name: "SR420", manufactured by Sartomer, 3,3,5-trimethylcyclohexane acrylate)
CTFA (trade name: "Viscoat #200", manufactured by Osaka Organic Chemical Industry Ltd., cyclic trimethylolpropane formal acrylate)
THFA (trade name: "Viscoat #150", manufactured by Osaka Organic Chemical Industry Ltd., tetrahydrofurfuryl acrylate)
MEDOL-10 (trade name: "MEDOL-10", manufactured by Osaka Organic Chemical Industry Ltd., (2-methyl-2-ethyl-1,3-dioxoran-4-yl)methyl acrylate)
FA-511AS (manufactured by Hitachi Chemical Co., Ltd., dicyclopentenyl acrylate)
FA-512AS (manufactured by Hitachi Chemical Co., Ltd., dicyclopentenyloxyethyl acrylate)
FA-513AS (manufactured by Hitachi Chemical Co., Ltd., dicyclopentanyl acrylate)
Multifunctional monomer
VEEA (manufactured by Nippon Shokubai Co., Ltd., 2-(2-vinyloxyethoxy)ethyl acrylate)
NPG(2PO)DA (trade name: "SR9003", manufactured by Sartomer, propoxylated (2) neopentyl glycol diacrylate)
TPGDA (trade name: "Viscoat #310HP", manufactured by Osaka Organic Chemical Industry Ltd., tripropylene glycol diacrylate)
Oligomer
EC6101 (trade name: "ETERCURE 6101", manufactured by Eternal Materials Co., Ltd., aliphatic urethane acrylate oligomer)
CN9893 (manufactured by Sartomer, aliphatic urethane acrylate oligomer)
Photopolymerization initiator
Omnirad 819 (manufactured by IGM Resins B.V., bis(2,4,6-trimethylbenzoyl)phenylphosphine oxide)
SpeedCure TPO (manufactured by Lambson, 2,4,6-trimethylbenzoyl diphenylphosphine oxide)
Speedcure DETX (manufactured by Lambson, 2,4-diethylthioxaneten-9-one)
Fluorescent whitener
TELALUX OB (manufactured by Clariant Japan K.K., 2,5-bis(5-tert-butyl-2-benzoxazolyl)thiophene)
Surfactant
BYK-UV3500 (manufactured by BYK Additives & Instruments, polyether-modified polydimethylsiloxane having an acryloyl group)
Polymerization inhibitor
LA-7RD (trade name: "ADK STAB LA-7RD", manufactured by ADEKA Corporation, 4-hydroxy-2,2,6,6-tetramethylpiperidinyl-1-oxyl)
MEHQ (trade name: "p-Methoxyphenol", manufactured by Kanto Chemical Co., Inc., hydroquinone monomethyl ether)

2. Evaluation Method 2.1. Evaluation of Viscosity

The viscosity of each radiation-curable ink jet composition was measured with a rotational viscometer (product name: "DVM-E type rotational viscometer manufactured by Tokyo Keiki Inc.)" under an environment of 20° C. using a DVM-E type cone having a cone radius of 2.4 cm at a cone angle of 1° 34' and a rotation speed of 10 rpm. The evaluation criteria are as follows:

Evaluation Criteria

AA: a viscosity of 15 mPa·s or less,

A: a viscosity of higher than 15 mPa·s and 20 mPa·s or less,

B: a viscosity of higher than 20 mPa·s and 25 mPa·s or less,

C: a viscosity of higher than 25 mPa·s and 30 mPa·s or less, and

D: a viscosity of higher than 30 mPa·s.

2.2. Evaluation of Curability

Cotton swab-weighted tacking properties were evaluated. Specifically, each radiation-curable ink jet composition was applied onto respective polyvinyl chloride media with a bar coater such that the thickness of the coating film of the ink jet composition was 10 μm and was irradiated with ultraviolet rays with a predetermined irradiation intensity at a rate of 0.04 sec/cm. On this occasion, as the light source, LEDs having a peak wavelength of 395 nm were used. Subsequently, the coating film surface was rubbed with a cotton swab, and the curability was evaluated based on the irradiation intensity at which the swab was not stained. The evaluation criteria are as follows:

Evaluation Criteria
AA: the irradiation intensity is less than 0.5 W/cm², 
A: the irradiation intensity is 0.5 W/cm² or more and less than 2.5 W/cm², and
B: the irradiation intensity is 2.5 W/cm² or more.

2.3. Evaluation of Adhesion

Cured coating films were each produced on a polyvinyl chloride film as in the evaluation of curability. The resulting coating film was subjected to evaluation by a cross-cut test in accordance with JIS K5600-5-6.

More specifically, a cutting tool (cutter) was placed on a coating film such that the blade of the cutting tool was perpendicular to the coating film, and a grid of 10×10 squares was made by cutting at a distance of 1 mm between cuts. Transparent adhesive tape (width: 25 mm) with a length of about 75 mm was attached to the grid and was sufficiently rubbed with a finger so that the cured film could be seen through the tape. Subsequently, within 5 minutes after the adhesion, the tape was reliably peeled off from the cured film at an angle of approximately 60° for 0.5 to 1.0 seconds, and the condition of the grid was visually verified. The evaluation criteria are as follows:
Evaluation Criteria
AA: no peeling of the cured film was observed in the grid,
A: peeling of the cured film was observed in less than 50% of the grid, and
B: peeling of the cured film was observed in 50% or more of the grid.

2.4. Evaluation of Scratch Resistance

The cured coating films produced in the evaluation of curability were evaluated by a micro-scratch test in accordance with JIS R3255. In the measurement, the withstand load was measured as scratch resistance using a nano-layer scratch tester (CSR-5000, manufactured by Nanotec Corporation). Microscratching was performed while applying a load, and the load when a probe reached the medium surface was defined as the withstand load. A higher withstand load means more excellent scratch resistance. In the measurement, the probe stylus diameter was 15 μm, the amplitude was 100 μm, and the scratching rate was 10 μm/sec. The evaluation criteria are as follows:
Evaluation Criteria
AA: 30 mN/cm² or more,
A: 25 mN/cm² or more and less than 30 mN/cm²,
B: 20 mN/cm² or more and less than 25 mN/cm², and
C: less than 20 mN/cm².

2.5. Evaluation of Stretchability

Each radiation-curable ink jet composition was applied onto a polyvinyl chloride film (JT5829R, manufactured by MACtac LLC) with a bar coater such that the coating thickness was 10 μm, and was then cured using a metal halide lamp (manufactured by Eye Graphics Co., Ltd.) at an energy of 400 mJ/cm² to form each coating film. The vinyl chloride film as release paper on which the coating film was formed was peeled off, and the coating film was cut into a strip shape having a width of 1 cm and a length of 8 cm to prepare test pieces. The elongation percentage as the stretchability of each test piece was measured using a tension tester (TENSILON, manufactured by ORIENTEC Corporation). The elongation percentage was the numerical value at the time when a crack occurred by pulling the test piece at 5 mm/min. The numerical value was calculated by [(length at cracking)−(length before elongation)]/(length before elongation)×100. The evaluation criteria are as follows:
Evaluation Criteria
AA: 300% or more,
A: 250% or more and less than 300%,
B: 200% or more and less than 250%, and
C: less than 200%.

2.6. Storage Stability

Each radiation-curable ink jet composition was filled in respective glass bottles and was stored at 60° C. for 14 days. A change in viscosity before and after the storage was verified by assuming the viscosity before and after storage. The evaluation criteria are as follows:
Evaluation Criteria
A: an increase in viscosity of less than 5%,
B: an increase in viscosity of 5% or more and less than 15%, and
C: an increase in viscosity of 15% or more.

3. Evaluation Results

Tables 1 and 2 show the compositions of the radiation-curable ink jet compositions used in each example and the results of evaluation. It is revealed from Tables 1 and 2 that the radiation-curable ink jet compositions containing a monofunctional (meth)acrylate monomer and vinyl methyl oxazolidinone of Examples 1 to 35 have low viscosity and excellent stretchability and have excellent curability, adhesion, scratch resistance, and storage stability.

For details, comparison of each Example and Comparative Example 1 reveals that the viscosity is decreased and the stretchability, curability, adhesion, and scratch resistance are further improved by including vinyl methyl oxazolidinone. In addition, comparison of each Example and Comparative Example 2 reveals that stretchability is further improved by including a monofunctional (meth)acrylate monomer.

Furthermore, comparison of Example 35 and other Examples reveals that the use of 2,2,6,6-tetramethylpiperidinyl-1-oxyl or a derivative thereof as a polymerization inhibitor further improves the storage stability in a system including a monofunctional (meth)acrylate monomer and vinyl methyl oxazolidinone.

What is claimed is:

1. A radiation-curable ink jet composition comprising:
a multifunctional monomer; and
vinyl methyl oxazolidinone; wherein
the content of the multifunctional monomer is 5 to 50 mass % based on the total amount of the radiation-curable ink jet composition.

2. The radiation-curable ink jet composition according to claim 1, wherein
a content of the vinyl methyl oxazolidinone is 5 to 40 mass % based on total amount of the radiation-curable ink jet composition.

3. The radiation-curable ink jet composition according to claim 1, comprising:
a vinyl ether group-containing (meth)acrylate represented by the following formula (1):

where, R1 is a hydrogen atom or a methyl group, R2 is a divalent C2-C20 organic residue, and R3 is a hydrogen atom or a monovalent C1-C11 organic residue.

4. The radiation-curable ink jet composition according to claim 3, wherein
a content of the vinyl ether group-containing (meth)acrylate is 10 to 50 mass % based on total amount of the radiation-curable ink jet composition.

5. The radiation-curable ink jet composition according to claim 1, comprising:
at least any of a monofunctional alicyclic (meth)acrylate, a monofunctional (meth)acrylate having a cyclic ether structure, or a monofunctional (meth)acrylate having a crosslinked condensed ring structure, as the monofunctional (meth)acrylate monomer.

6. The radiation-curable ink jet composition according to claim 1, comprising:
a multifunctional (meth)acrylate, wherein
a content of the multifunctional (meth)acrylate is 2 to 20 mass % based on total amount of the radiation-curable ink jet composition.

7. The radiation-curable ink jet composition according to claim 1, comprising:
a urethane acrylate oligomer, wherein
a content of the urethane acrylate oligomer is 1 to 10 mass % based on total amount of the radiation-curable ink jet composition.

8. The radiation-curable ink jet composition according to claim 1, comprising:
2,2,6,6-tetramethylpiperidinyl-1-oxyl or a derivative thereof as a polymerization inhibitor.

9. The radiation-curable ink jet composition according to claim 1, comprising:
an acylphosphine oxide-based polymerization initiator as a photopolymerization initiator.

10. The radiation-curable ink jet composition according to claim 1, comprising:
a fluorescent whitener.

11. An ink jet method comprising:
a discharging step of discharging the radiation-curable ink jet composition according to claim 1 by a liquid jet head to adhere the composition to a recording medium; and
an irradiation step irradiating the radiation-curable ink jet composition adhered to the recording medium with radioactive rays.

* * * * *